Patented Nov. 17, 1925.

1,561,767

UNITED STATES PATENT OFFICE.

RAYMOND F. BACON AND WILLIAM H. KOBBÉ, OF NEW YORK, N. Y., AND PERRY H. BASCOM, OF BOUNDBROOK, NEW JERSEY, ASSIGNORS TO TEXAS GULF SULPHUR COMPANY, OF BAY CITY, TEXAS, A CORPORATION OF TEXAS.

SULPHUR-CONTAINING ARTICLE.

No Drawing.    Application filed November 25, 1922.    Serial No. 603,351.

*To all whom it may concern:*

Be it known that we, RAYMOND F. BACON and WILLIAM H. KOBBÉ, citizens of the United States, residing at New York city, county and State of New York, and PERRY H. BASCOM, a citizen of the United States, residing at Boundbrook, county of Somerset, State of New Jersey, have invented certain new and useful Improvements in Sulphur-Containing Articles; and we do hereby declare the following to be a full, clear, and exact description of the invention, such as will enable others skilled in the art to which it appertains to make and use the same.

This invention relates to sulphur-containing compositions, and has for its object the provision of an improved sulphur-containing composition and method of making the same.

The present invention contemplates the provision of an improved sulphur-containing composition of a structural character possessing superior strength or other advantageous physical properties in consequence of the association therewith or inclusion therein of a substantial quantity of congealed sulphur.

Our invention involves the association or combination with a concrete structure of sulphur in such a manner as to impart thereto superior strength, increased imperviousness to moisture, increased resistance to decomposition or decay, increased resistance to corrosion or disintegration as the result of contact with corrosive liquors such as sea water, or other advantageous property. Thus, as a result of the present invention, wide and diversified fields in the industrial arts are opened up for the use of these concrete structures, where now their usefulness is closely circumscribed by one or more inherent physical weaknesses such as low tensile strength, perviousness to moisture, tendency to decay or disintegrate, etc.

Sulphur itself does not possess sufficient strength to be generally useful as a structural material. Indeed, solid sulphur is relatively brittle. We have discovered, however, that sulphur when appropriately incorporated in the interstices of a concrete structure imparts thereto certain advantageous properties or characteristics which render the resulting composition suitable for many uses for which the concrete structure itself is unsatisfactory and frequently utterly unfit. The most remarkable property which the improved sulphur-containing composition of the invention possesses is its superior strength, as compared with the strength of the concrete structure itself. Thus, in the case of concrete or cement structures or objects having their interstices filled with sulphur in accordance with the invention, we find that the tensile strength may be readily increased from 10 to 15 times that of the concrete or cement itself.

In its broad aspect, the composition of the invention comprises a concrete structure having its interstices throughout a substantial depth inside the surface thereof filled with congealed sulphur. By congealed sulphur, we mean sulphur which has solidified or congealed in situ in the interstices of the concrete structure, the sulphur being initially introduced in a liquid or molten condition into such interstices. In consequence of the properties imparted to the resulting composition by the sulphur, it is adapted and utilized, in accordance with the invention, for the attainment of practical effects not capable of realization by the concrete structure itself. Where imperviousness to moisture or resistance to decay or attack by corrosive liquors is the principal property which it is desired that the composition of the invention possess, the concrete structure need have only those interstices throughout a substantial depth inside its surface filled with congealed sulphur. In all cases, however, there will be a substantial penetration of the sulphur into the interior of the mass of the concrete structure. In addition, the surface of the concrete structure may be covered or coated with a thin layer or film of sulphur for the purpose of increasing the imperviousness of the resulting composition to the penetration of moisture. Where it is essential or desirable that the composition of the invention possess a maximum degree of strength, the interstices of the concrete structure throughout substantially the entire mass thereof will be filled with congealed sulphur.

In carrying out the invention, the concrete structure is impregnated with sulphur in any appropriate manner whereby the sulphur thoroughly penetrates and fills, to the desired extent, the interstices of the structure. A convenient and satisfactory method of impregnating a concrete structure which can be conveniently handled consists in immersing the structure in a bath of molten sulphur, say maintained at a temperature just slightly above the melting point of the sulphur, for example, about 125° C. The length of time that the structure should remain immersed in the molten sulphur depends upon the depth within the surface of the medium to which it is desired to carry the impregnation with sulphur. In practice, the time required for effecting the desired impregnation of the concrete structure with sulphur varies from a few minutes to several hours or even days, depending, as before stated, on the extent of impregnation desired, as well as upon the porosity and mass of the medium itself. The length of time necessary for securing the contemplated impregnation of the concrete structure with sulphur may be advantageously hastened by preheating the concrete structure before immersing it in the bath of molten sulphur. Thus, for example, we have found it of advantage in certain instances to heat the concrete structure to a temperature of about 115° to 120° C. and introduce it at this temperature into the bath of molten sulphur.

The concrete structure, having its interstices filled to the desired extent with sulphur by immersion in a bath of molten sulphur, must be carefully withdrawn from the molten sulphur in order to insure that a negligible or unobjectionable quantity of sulphur will thereafter flow out of the interstices before solidifying. To this end, we have found it generally of advantage to withdraw the impregnated structural porous medium from the bath of molten sulphur at as low a temperature as practicable. Thus the bath and the concrete structure are allowed to cool until the sulphur begins to show indications of congealing upon the surface of the medium when the surface is lifted from contact with the bath. By allowing the impregnated concrete structure to cool approximately to this point, the melting or vaporization of the sulphur which is upon and near the surface of the concrete structure by the heat contained in the medium itself is prevented. When the bath and the impregnated concrete structure have cooled approximately to this temperature, the medium is carefully withdrawn from the bath and the sulphur on the surface thereof sufficiently congeals during the withdrawal to seal within the concrete structure substantially all the sulphur which has been received within its interstices.

We have secured very remarkable results by impregnating with sulphur, in accordance with the principles of the invention, concrete made up of two parts of sand and one part of Portland cement. Test pieces of the concrete displayed tensile strengths varying from 100 to 150 pounds per square inch. When impregnated with sulphur throughout substantially the entire mass, similar test pieces displayed tensile strengths generally exceeding 1000 pounds per square inch, and usually in the neighborhood of 1500 pounds per square inch. This very remarkable increase in tensile strength renders the sulphur-containing concrete composition of the invention admirably adapted for the formation of structures for which the concrete itself is unsatisfactory. As a result of our investigations, we find that concrete made up in the ordinary way will take up, in carrying out our present invention, from 15 to 20%, and more, of sulphur. Just what rôle the congealed sulphur plays in so remarkably increasing the tensile strength of the concrete we are not prepared to say, but it seems probable to us that the sulphur congealed in the interstices of the concrete acts to more firmly secure together the individual particles of the concrete mass. Nor are we able to state whether or not there is any chemical action between the sulphur and the concrete, although it seems not unlikely that the sulphur may perhaps react with the iron or perhaps with the lime of the concrete to form sulfides which may exercise a very pronounced effect in cementing particles of the concrete more securely together.

We have also found that ordinary burnt clay building bricks when impregnated with sulphur, in accordance with our invention, are remarkably altered in their physical properties, more notably strength and hardness. An ordinary building brick, particularly of the inferior grades, is relatively brittle and can be easily broken or chipped by a blow from an ordinary hammer. When impregnated with from 20 to 30% by weight of congealed sulphur, such a brick becomes very strong and hard and can only, with difficulty, be broken by the blow from a hammer. The sulphur impregnated brick resembles in appearance and property a vitrified brick, and can be used where strength or hardness is required, as, for example, in street paving. In practice, we have secured satisfactory results by immersing these bricks (at room temperature, that is, without any preheating) in a bath of molten sulphur maintained at a temperature of about 125° C. for from two to five hours. During this immersion, an ordinary building brick will absorb within its interstices from 20 to 30% by weight of sulphur. As previously stated, care must be exercised in withdrawing the brick from the molten sulphur to insure the solidification of the sulphur in the interstices of the brick.

Burnt clay enters into the manufacture of a large variety of structures which may be advantageously impregnated with sulphur. Thus ceramic ware, pottery, terracotta, tiles and the like, may be impregnated with sulphur.

Concrete and burnt clay structures are frequently placed or used in locations where they are subjected to surrounding corrosive influences. Thus, concrete structures standing in contact with sea-water undergo objectionable deterioration, and frequently concrete structures embedded in the earth are disintegrated by the action of surrounding soil water, more particularly in localities where this water is alkaline. Similarly, burnt clay structures, for example, drain tiles, are frequently subjected to the action of soil waters or other liquors which have a corrosive action thereon. In all these instances, the resistance to corrosion or disintegration of the structure can be advantageously increased by impregnating the medium to an appropriate extent with sulphur, in accordance with the principles of the present invention.

The impregnation of structures, more particularly of concrete or burnt clay, with sulphur generally imparts to the resulting composition a substantial degree of imperviousness to moisture. In other words, the sulphur-contaning composition of the invention is substantially water-proof. In addition, the sulphur-containing composition is of superior resistance to the action of corrosive liquors, such as sea-water, acids, weak alkalies, etc. Also, the electrical resistance of the sulphur-containing composition is ordinarily greater than that of the composition itself. The sulphur in the composition, moreover, serves to render the composition, in some measure at least, germ, insect and vermin-proof. But in most cases, the outstanding characteristic and advantage of the sulphur-containing composition is its superior strength as compared with the concrete structure itself. These properties of the improved sulphur-containing composition of the invention render it available for use in many fields where the structure itself would be unsatisfactory. Thus, in consequence of its increased strength and resistance to corrosion, the sulphur-containing concrete composition of the invention may be employed with advantage in the formation of piles in contact with sea-water, for the formation of fence posts in contact with corrosive soil water, etc.

Ornamental or art objects of concrete, burnt clay, and the like, as well as many other concrete, burnt clay and similar porous objects, such, for example, as burial vaults, building blocks and tiles, conduits, garden furniture, etc., may to advantage be impregnated with sulphur, in whole or in part, in accordance with the principles of our invention. Where it is desired to impart a characteristic color or artistic effect, more particularly in the case of ornamental or art objects, appropriate pigments may be mixed with the molten sulphur to produce these effects. Thus, we have added lead chromate, various oxides of lead, turpentine, etc., to the molten sulphur for the purpose of giving pleasing color effects to the improved composition of the invention.

In addition to impregnating a structure by immersion in sulphur, the invention contemplates the impregnation with sulphur of structures which it is not practicable to immerse in molten sulphur. Thus, existing or standing structures of concrete, or other appropriate porous material, may to advantage have their interstices filled, to the desired extent, with congealed sulphur. The invention, accordingly, contemplates the impregnation with sulphur of dams, sea walls, cellars, piling, jetties, trestles, bridges, aquaria, swimming pools, tanks, oil reservoirs, aqueducts, irrigation ditches, canals, blocks, cisterns, silos, magazines, fortifications, drydocks, quays, water fronts, wharves, docks, standpipes, vats and vaults, where these structures are formed of concrete or other porous material adapted to be impregnated with sulphur according to the principles of our present invention. Such existing or standing structures of porous material may be impregnated with sulphur by applying to and maintaining in close contact with the surface or surfaces thereof molten sulphur for a sufficient period of time to bring about the desired penetration of the sulphur into the interstices of the porous material. In the case of horizontal surfaces, such, for example, as a concrete road, the impregnation with sulphur may be effected by applying heat to the horizontal surface of the structure, say, for example, by means of the ordinary asphalt street-heaters, and then sprinkling flour or other form of sulphur upon the heated surface and allowing the sulphur to melt and penetrate into the interstices of the porous material. In the case of walls or vertical surfaces, the sulphur may be applied thereto over areas of say ten feet square by means of a sheet metal receptacle, containing the molten sulphur, with appropriate means for maintaining the sulphur at the desired elevated temperature and suitable packing around the edges of the receptacle to effect a tight joint and prevent leakage. We have found that a very substantial penetration of sulphur into the interstices of a concrete structure can be effected by applying heat to the surface of the structure and then applying to the heated surface sulphur either in the form of powder or in a molten condition. The temperature to which the porous structure is heated and the depth within the mass of this structure to which heat in sufficient amount penetrates determines in large measure the degree or extent of impregnation of the porous structure with sulphur.

Although, our preferred practice, in carrying out the invention, makes use of sulphur alone for filling, to the desired extent, the interstices of the concrete structure, it is to be understood that certain sulphur-containing cements and mixtures are also available in lieu of sulphur alone. Thus, the interstices of the concrete structure may be filled with sulphur cements or mixtures made up of sulphur and an appropriate amount of sand or other silicious material, lime, asbestos, wood flour, talc, porous aggregate, vesicular basalt, etc.

Where the impregnation of the concrete structure is effected by immersion in molten sulphur, it is to be understood that the temperature of the molten sulphur may be controlled or maintained in suitable manner to effect the most satisfactory results. While we have found, in most cases, that entirely satisfactory results are obtained by maintaining the bath of molten sulphur at a temperature of about 125° C., we have also found, that higher temperatures may sometimes be employed with advantage. Sulphur melts at about 115° C. At temperatures slightly above its melting point (say 125° C.), the sulphur is a mobile liquid. As the temperature rises, the sulphur becomes viscid and at 250° C. the sulphur can no longer be poured. Above 300° C., however, the sulphur again becomes mobile. It is sometimes of advantage to immerse the concrete structure in the bath of molten sulphur at a temperature of around 125° C. and to then gradually raise the temperature of the bath until the sulphur becomes viscous, or even again mobile. This causes the heat of the bath to penetrate well into the interstices of the porous medium, and upon gradually lowering the temperature of the bath the interstices become substantially filled with sulphur. As previously explained, it is ordinarily advisable to remove the object from the bath of molten sulphur at as low a temperature as practicable.

In the case of relatively large objects or structures to be impregnated by immersion in molten sulphur, it is in some cases of advantage to withdraw the air from the interstices of the porous material in a vacuum chamber and then fill the chamber, while maintained under reduced pressure, with the molten sulphur, and subsequently, if necessary, increase the pressure within the chamber above the normal atmospheric pressure.

Another way in which the penetration of the molten sulphur into the interstices of the concrete structure may be assisted is to first fill the interstices of the structure with a liquid, such as water, kerosene, petroleum oils, methyl alcohol, carbon-tetrachloride, benzol, etc., which is volatile at temperatures slightly below the melting temperature of sulphur. Having filled the interstices of the concrete structure with such a liquid, the structure is immersed in the bath of molten sulphur, and the temperature of the bath regulated so as to expel by volatilization all of the liquid in the interstices of the structure. As a result of the expulsion of the volatilizable liquid from the interstices of the structure, a partial vacuum is probably created in such interstices which promotes a very complete penetration of the molten sulphur into the interstices.

The sulphur-containing compositions of the invention are more or less metallic in their physical appearance, and when tapped with a hammer have a metallic ring.

We claim:—

1. A sulphur-containing article of the character described comprising a concrete structure having the interstices thereof throughout substantially its entire mass filled with congealed sulphur, said article having a tensile strength at least ten times that of the concrete structure itself.

2. A sulphur-containing article of the character described comprising a concrete structure having the interstices thereof filled with not less than 15% by weight of congealed sulphur.

In testimony whereof we affix our signatures.

RAYMOND F. BACON.
WILLIAM H. KOBBÉ.
PERRY H. BASCOM.